United States Patent
Tanemura et al.

(10) Patent No.: US 11,223,143 B2
(45) Date of Patent: Jan. 11, 2022

(54) RADAR DEVICE AND AIRCRAFT (71) Applicant: MITSUBISHI HEAVY INDUSTRIES, LTD., Tokyo (JP)

(72) Inventors: Tsunetoshi Tanemura, Tokyo (JP); Takuya Koyama, Tokyo (JP); Yasuyuki Kimata, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 384 days.

(21) Appl. No.: 16/335,061

(22) PCT Filed: Oct. 26, 2017

(86) PCT No.: PCT/JP2017/038779
§ 371 (c)(1),
(2) Date: Mar. 20, 2019

(87) PCT Pub. No.: WO2018/088230
PCT Pub. Date: May 17, 2018

(65) Prior Publication Data
US 2019/0280395 A1 Sep. 12, 2019

(30) Foreign Application Priority Data
Nov. 11, 2016 (JP) .............................. JP2016-220597

(51) Int. Cl.
*H01Q 21/24* (2006.01)
*G01S 13/04* (2006.01)
(Continued)

(52) U.S. Cl.
CPC ............ *H01Q 21/245* (2013.01); *G01S 7/03* (2013.01); *G01S 13/04* (2013.01); *G01S 13/88* (2013.01);
(Continued)

(58) Field of Classification Search
CPC .. H01Q 1/27; H01Q 3/00; H01Q 3/02; H01Q 3/04; H01Q 3/08; H01Q 21/245; G01S 13/88; G01S 13/883
See application file for complete search history.

(56) References Cited

U.S. PATENT DOCUMENTS 3,821,738 A * 6/1974 Quesinberry et al. .. G01S 13/68
342/77
3,903,523 A * 9/1975 Hartley, Jr. ............ H01Q 1/281
343/708
(Continued)

FOREIGN PATENT DOCUMENTS

JP 49-46849 5/1974
JP 57-125503 8/1982
(Continued)

OTHER PUBLICATIONS

International Search Report dated Nov. 28, 2017 in International (PCT) Application No. PCT/JP2017/038779 with English translation.

*Primary Examiner* — Peter M Bythrow
(74) *Attorney, Agent, or Firm* — Wenderoth, Lind & Ponack, L.L.P.

(57) ABSTRACT

The present invention is provided with: an antenna 23 having an antenna surface 28 for radiating radio waves so as to have a prescribed plane of polarization; a second rotary mechanism 22 which is connected to the antenna 23 and which rotates the antenna 23 about a second rotation axis I2 that is set in a normal direction orthogonal to the antenna surface 28; and a first rotary mechanism 21 which is connected to the second rotary mechanism 22 and which rotates the antenna 23 and the second rotary mechanism 22 about a first rotation axis I1 that is set in a direction slanted with respect to the second rotation axis I2.

11 Claims, 5 Drawing Sheets (51) Int. Cl.
*G01S 13/88* (2006.01)
*H01Q 19/17* (2006.01)
*H01Q 25/00* (2006.01)
*G01S 13/93* (2020.01)
*H01Q 3/04* (2006.01)
*H01Q 3/08* (2006.01)
*H01Q 1/28* (2006.01)
*G01S 7/03* (2006.01)

(52) U.S. Cl.
CPC ............... *G01S 13/93* (2013.01); *H01Q 1/28* (2013.01); *H01Q 3/04* (2013.01); *H01Q 3/08* (2013.01); *H01Q 19/175* (2013.01); *H01Q 25/008* (2013.01)

(56) References Cited

U.S. PATENT DOCUMENTS

| | | | | | |
|---|---|---|---|---|---|
| 3,984,837 | A | * | 10/1976 | Tatnall | H01Q 1/18 343/705 |
| 4,148,026 | A | * | 4/1979 | Gendreu | F41G 5/08 235/409 |
| 4,148,029 | A | * | 4/1979 | Quesinberry | G01S 13/68 342/106 |
| 4,179,696 | A | * | 12/1979 | Quesinberry | G01S 13/72 342/75 |
| 4,219,814 | A | * | 8/1980 | Johnson | G01S 13/89 342/105 |
| 4,224,507 | A | * | 9/1980 | Gendreu | G01S 13/4472 235/410 |
| 4,786,912 | A | * | 11/1988 | Brown | H01Q 1/18 343/757 |
| 5,149,011 | A | * | 9/1992 | Gratt | F41G 7/28 244/3.19 |
| 5,202,695 | A | * | 4/1993 | Hollandsworth | H01Q 1/18 244/3.16 |
| 5,225,839 | A | * | 7/1993 | Okurowski | G01S 7/025 342/174 |
| 5,526,008 | A | * | 6/1996 | Meserole | H01Q 3/20 343/705 |
| 5,922,039 | A | * | 7/1999 | Welch | H01Q 1/18 701/116 |
| 6,483,458 | B1 | * | 11/2002 | Carson | G01S 3/20 342/367 |
| 6,556,165 | B2 | * | 4/2003 | Fukushima | H01P 1/067 342/175 |
| 6,774,860 | B2 | * | 8/2004 | Downs | H01Q 1/185 343/711 |
| 7,528,613 | B1 | * | 5/2009 | Thompson | H01Q 3/06 324/637 |
| 7,741,991 | B1 | * | 6/2010 | MacBean | G01S 13/685 342/62 |
| 9,541,913 | B2 | * | 1/2017 | Shi | G05B 19/0426 |
| 9,696,416 | B2 | * | 7/2017 | Blase | H01Q 3/30 |
| 10,756,428 | B2 | * | 8/2020 | Royalty | H01Q 3/08 |
| 2004/0056813 | A1 | * | 3/2004 | Carter | H01Q 19/00 343/754 |
| 2006/0114164 | A1 | * | 6/2006 | Iluz | H01Q 21/064 343/757 |
| 2010/0141503 | A1 | * | 6/2010 | Baumatz | G01S 7/48 342/27 |
| 2010/0245196 | A1 | * | 9/2010 | Miron | H01Q 3/02 343/763 |
| 2010/0271274 | A1 | * | 10/2010 | Gibson | G01S 7/4026 343/705 |
| 2011/0285582 | A1 | * | 11/2011 | Zhang | H01Q 21/205 342/26 R |
| 2014/0361924 | A1 | * | 12/2014 | Lieven | H01Q 3/04 342/26 B |
| 2015/0054703 | A1 | * | 2/2015 | Yano | H01Q 19/193 343/762 |
| 2016/0233579 | A1 | * | 8/2016 | Oppenlaender | H01Q 1/125 |
| 2017/0301987 | A1 | * | 10/2017 | Mack | H01Q 3/02 |
| 2018/0031074 | A1 | * | 2/2018 | Aoki | F16F 15/002 |

FOREIGN PATENT DOCUMENTS

| | | |
|---|---|---|
| JP | 07-091896 | 4/1995 |
| JP | 2016-005168 | 1/2016 |

* cited by examiner

RADAR DEVICE AND AIRCRAFT

TECHNICAL FIELD

The present invention relates to a radar device and an aircraft.

BACKGROUND ART

In related art, as a radar device, a radar device which radiates a radio beam by changing an orientation of an antenna by a gimbal mechanism is known (for example, refer to Japanese Unexamined Patent Application Publication No. 07-091896).

A gimbal mechanism changes an orientation of an antenna in order to enlarge a covering area of a radar. Here, for example, as the gimbal mechanism, there is a gimbal mechanism in which two axes are orthogonal to each other. In the gimbal mechanism, a gimbal ring of each axis is disposed. In a case where the gimbal ring is disposed, the antenna is disposed in a state of protruding from the gimbal mechanism such that the gimbal ring does not cover the antenna. In this case, the antenna is disposed so as to protrude, and thus, it is necessary to provide a counter weight of the antenna in the gimbal mechanism. Accordingly, in a radar device using the gimbal mechanism, a volume of the radar device increases, and thus, weight thereof increases. Accordingly, it is difficult to mount the radar device having the gimbal mechanism on an airframe whose weight is strictly limited. Meanwhile, in a case where the covering area of the radar is enlarged without using the gimbal mechanism, it is considered that a plurality of antennas are provided. However, in this case, a volume of a radar device increases.

Accordingly, an object of the present invention is to provide a radar device and an aircraft capable of having a compact configuration while widening a covering area.

Solution to Problem

According to an aspect of the present invention, there is provided a radar device including: an antenna which has an antenna surface radiating radio waves so as to be a predetermined plane of polarization; a second rotation mechanism which is connected to the antenna and rotates the antenna about a second rotation axis with a normal direction orthogonal to the antenna surface as an axial direction of the second rotation axis; and a first rotation mechanism which is connected to the second rotation mechanism and rotates the antenna and the second rotation mechanism about a first rotation axis with a direction inclined with respect to the second rotation axis as an axial direction of the first rotation axis.

According to this configuration, since the first rotation axis is inclined with respect to the second rotation axis, the antenna and the second rotation mechanism are rotated about the first rotation axis by the first rotation mechanism, and thus, the orientation of antenna, that is, a radiation direction of the radio wave can be changed. Accordingly, the covering area of the radar device can be made a wide area. In this case, if the orientation of the antenna is changed by the first rotation mechanism, the orientation of the plane of polarization of the antenna is also changed. Therefore, by rotating the antenna within the antenna surface about the second rotation axis by the second rotation mechanism, the orientation of the plane of polarization can be set to a predetermined orientation. Accordingly, the plane of polarization of the antenna can be set to a predetermined orientation suitable for the operation of the radar device. Particularly, in a case where the antenna is provided in the radome, the orientation of the plane of polarization can be set to a constant orientation, and it is possible to suppress the degradation in the detection performance generated by a change in characteristics of the radome. In addition, the first rotation mechanism is connected to the second rotation mechanism, the second rotation mechanism is connected to the antenna, and by rotating the rotation mechanisms, it is possible to easily change the orientation of the antenna by a simple configuration without providing a mechanism having a large volume such as a gimbal mechanism, and a compact configuration can be realized.

In addition, preferably, the first rotation axis is a roll axis of an airframe on which the antenna is mounted.

According to this configuration, it is possible to change the orientation of the antenna about the roll axis of the airframe, and thus, it is possible to enlarge the covering area about the roll axis of the airframe.

In addition, preferably, the radar device further includes a control unit which controls the first rotation mechanism and the second rotation mechanism, in which a reference plane of polarization which is a reference is set in advance and the control unit controls the first rotation mechanism and the second rotation mechanism such that the plane of polarization of the antenna is the reference plane of polarization.

According to this configuration, even when the orientation of the antenna is changed, the plane of polarization of the antenna can be maintained at the reference plane of polarization, and thus, it is possible to suppress degradation in detection performance.

Moreover, preferably, in a case where the control unit controls a rotation direction of the first rotation mechanism in a forward rotation direction, the control unit controls a rotation direction of the second rotation mechanism in a rearward rotation direction.

According to this configuration, the orientation of the plane of polarization of the antenna which is changed in the forward rotation direction by the rotation of the first rotation mechanism can be canceled off by the rotation of the second rotation mechanism in the rearward rotation direction, and thus, the plane of polarization of the antenna can be easily maintained at the reference plane of polarization.

Moreover, preferably, the reference plane of polarization is a plane of polarization which is fixed with reference to an airframe coordinate system of an airframe on which the antenna is mounted.

According to this configuration, the reference plane of polarization is fixed to the airframe, and thus, for example, in a case where the antenna is provided in the radome, the orientation of the plane of polarization can be set to a constant orientation, and it is possible to suppress the degradation in the detection performance generated by a change in characteristics of the radome.

In addition, preferably, the reference plane of polarization is a plane of polarization fixed with reference to a ground coordinate system.

According to this configuration, the reference plane of polarization is fixed to the ground. Therefore, even in a case where the posture of the airframe on which the antenna is mounted is changed, the orientation of the plane of polarization in a space on the ground can be set to a constant orientation, and it is possible to suppress the degradation in the detection performance generated by a change of the posture of the airframe. In addition, for example, as the plane of polarization fixed with reference to the ground coordinate system, there is a plane of polarization of vertically polarized waves.

In addition, preferably, the control unit acquires posture information which is information on a posture angle of an airframe on which the antenna is mounted, and controls the first rotation mechanism and the second rotation mechanism based on the posture information such that the plane of polarization of the antenna is the reference plane of polarization fixed with reference to the ground coordinate system.

According to this configuration, even in the case where the posture of the airframe is changed, the plane of polarization of the antenna can be maintained at the reference plane of polarization fixed to the ground, and it is possible to suppress the degradation in the detection performance.

In addition, preferably, a polarization plane airframe fixed mode in which the reference plane of polarization is fixed with reference to an airframe coordinate system of an airframe on which the antenna is mounted and a polarization plane ground fixed mode in which the reference plane of polarization is fixed with reference to the ground coordinate system are prepared in advance, and the control unit includes a switching circuit which performs switching between the polarization plane airframe fixed mode and the polarization plane ground fixed mode.

According to this configuration, the polarization plane airframe fixed mode and the polarization plane ground fixed mode can be appropriately switched, and thus, it is possible to increase versatility.

Moreover, preferably, the control unit individually controls the first rotation mechanism and the second rotation mechanism, inputs a first angle command signal to the first rotation mechanism, and inputs a second angle command signal to the second rotation mechanism to simultaneously control the first rotation mechanism and the second rotation mechanism.

According to this configuration, the first rotation mechanism and the second rotation mechanism are individually controlled simultaneously, and thus, it is possible to rapidly control the first rotation mechanism and the second rotation mechanism, it is possible to suppress a time lag, and it is possible to accurately perform rapid detection.

In addition, preferably, the radar device further includes a third rotation mechanism which inclines the second rotation axis with respect to the first rotation axis about a third rotation axis provided on the second rotation axis with a direction orthogonal to the second rotation axis as an axial direction of the third rotation axis.

According to this configuration, the inclination angle of the second rotation axis with respect to the first rotation axis can be an appropriate angle by the third rotation mechanism. Accordingly, for example, the second rotation axis can be inclined with respect to the first rotation axis such that the area of the antenna surface is the maximum in a direction in which the antenna surface stands toward the detected target, that is, in a direction in which the target and the antenna surface face each other. Therefore, it is possible to suppress a loss of the radio waves radiated from the antenna surface, and thus, it is possible to increase a detection length, and it is possible to detect a further distant target. In addition, for example, the covering area can be increased by lowering the antenna surface, that is, by increasing the inclination angle of the second rotation axis with respect to the first rotation axis. From the above, the second rotation axis with respect to the first rotation axis is inclined by the third rotation mechanism, and thus, it is possible to increase the versatility.

According to another aspect of the present invention, there is provided an aircraft including: the radar device; and an airframe having a nose on which the radar device is mounted.

According to this configuration, it is possible to appropriately detect the target by the compact radar device having a wide covering area.

DESCRIPTION OF EMBODIMENTS

Hereinafter, embodiments according to the present invention will be described in detail with reference to the drawings. Moreover, the present invention is not limited by the embodiments. In addition, constituent elements in the following embodiments include constituent elements which can be easily replaced by a person skilled in the art or constituent elements which are substantially the same. Moreover, the constituent elements described below can be appropriately combined, and in a case where there are a plurality of embodiments, it is also possible to combine the respective embodiments.

First Embodiment

Figure 1:
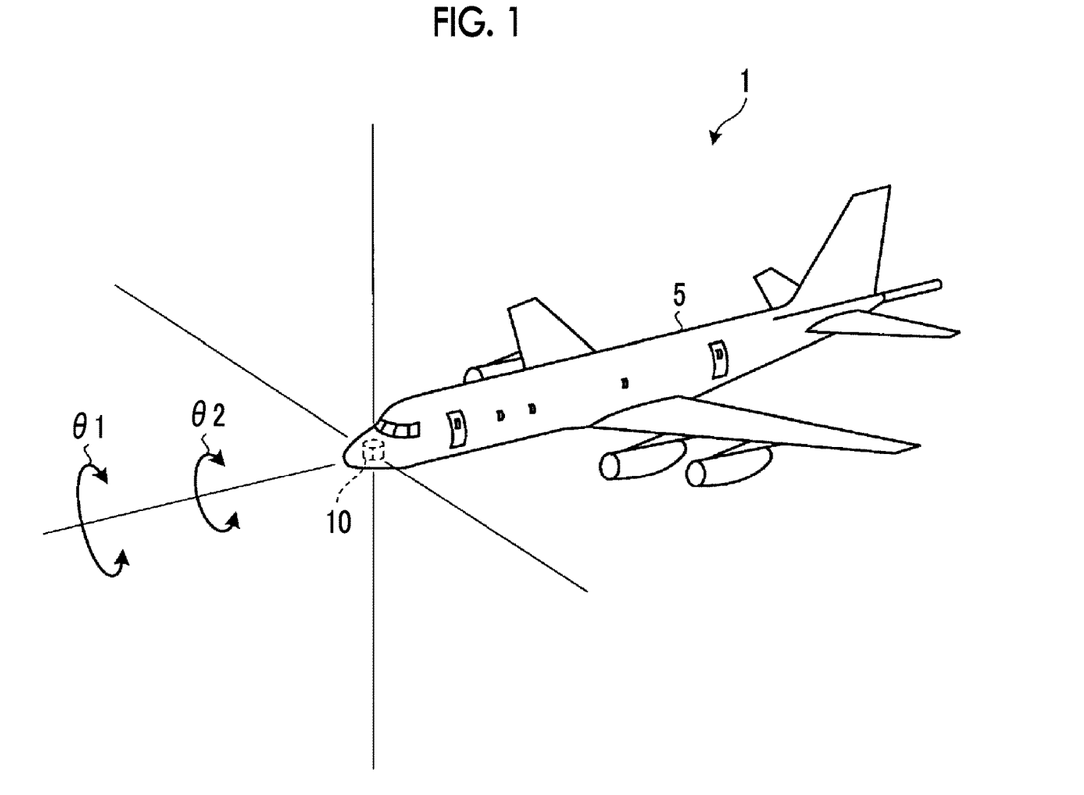
FIG. 1 is a perspective diagram schematically showing an aircraft in which a radar device according to a first embodiment is provided.
Figure 2:
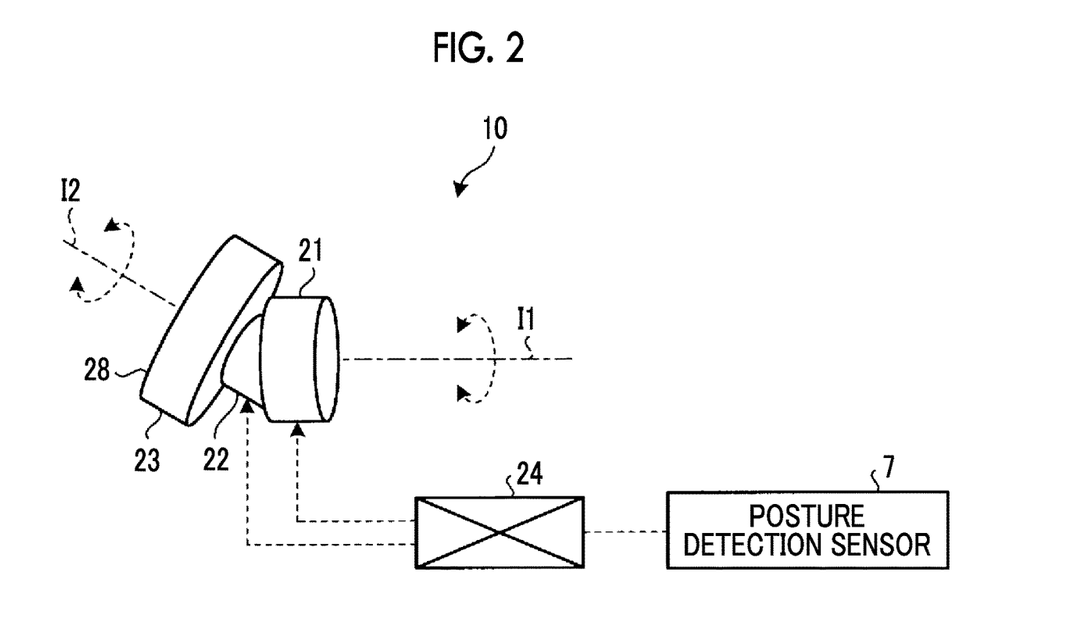
FIG. 2 is a perspective diagram schematically showing the radar device according to the first embodiment.
Figure 3:
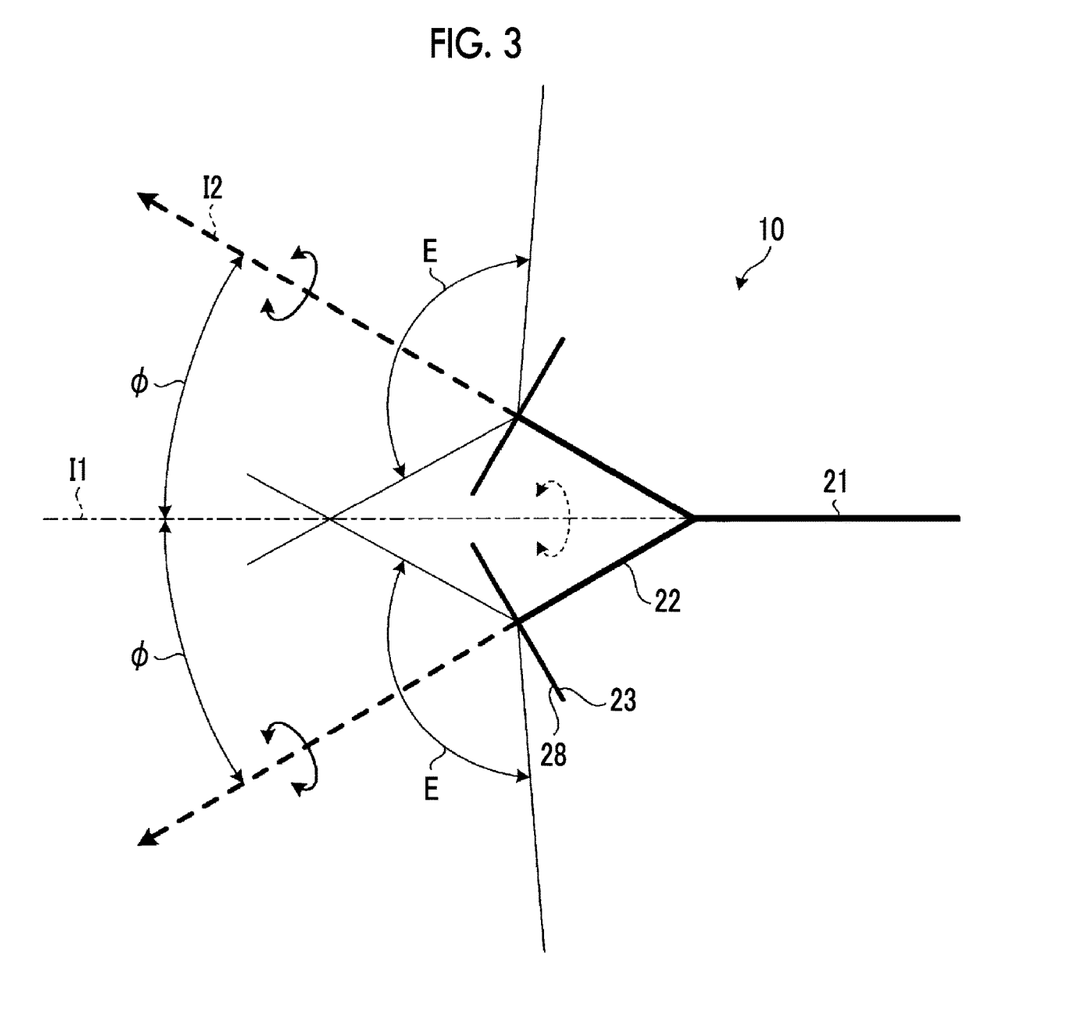
FIG. 3 is an explanatory diagram concerning a covering area of the radar device according to the first embodiment.
Figure 4:
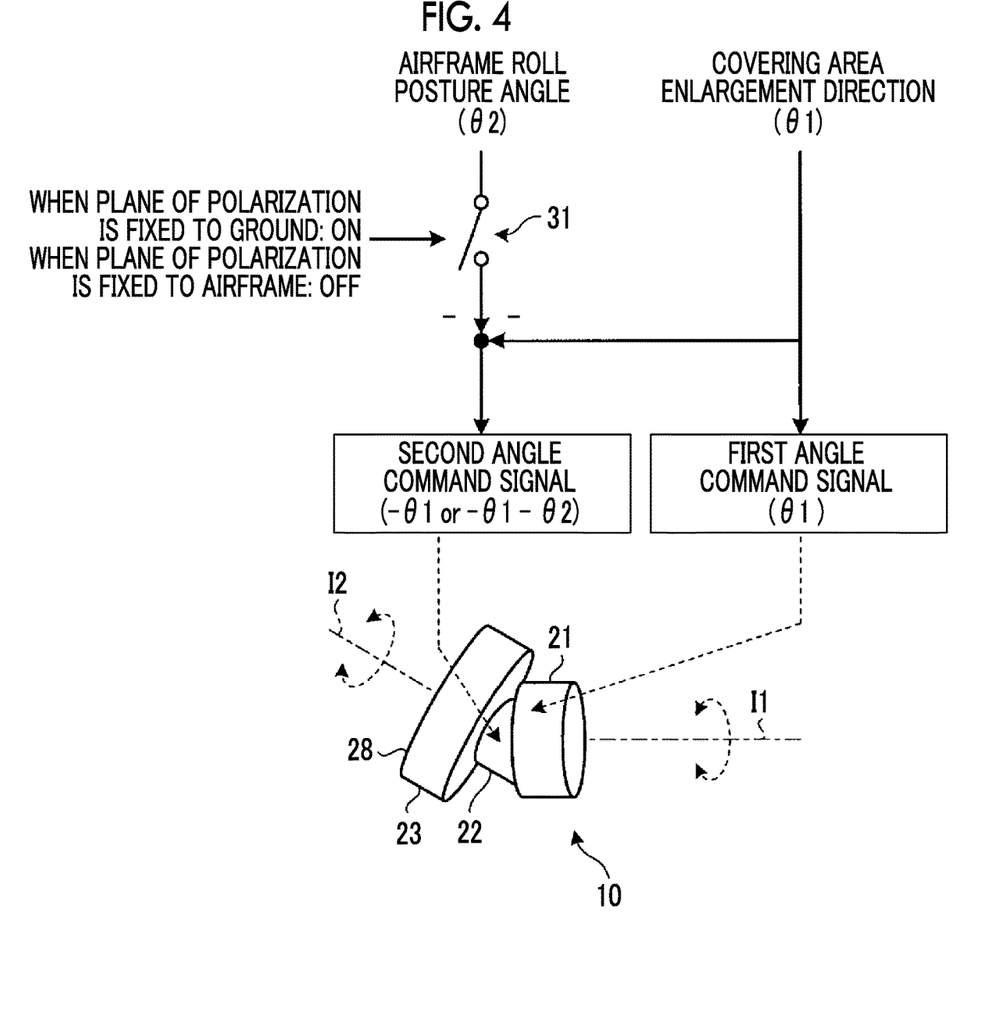
FIG. 4 is an explanatory diagram concerning a control unit of the radar device according to the first embodiment.

For example, as shown in FIG. 1, a radar device 10 according to a first embodiment is mounted on a nose of an airframe 5 of an aircraft 1 and detects a target. Here, FIG. 1 is a perspective diagram schematically showing the aircraft in which the radar device according to the first embodiment is provided. FIG. 2 is a perspective diagram schematically showing the radar device according to the first embodiment. FIG. 3 is an explanatory diagram concerning a covering area of the radar device according to the first embodiment. FIG. 4 is an explanatory diagram concerning a control unit of the radar device according to the first embodiment.

As shown in FIG. 1, in the aircraft 1, a direction in which the nose and a tail are connected to each other is an axial direction of a roll axis, a direction in which a left wing and a right wing orthogonal to the roll axis are connected to each other is an axial direction of a pitch axis, and a direction orthogonal to the roll axis and the pitch axis is an axial direction of a yaw axis. The aircraft 1 includes a posture detection sensor 7 which detects a posture of the airframe 5 (refer to FIG. 2), and the posture detection sensor 7 is electrically connected to a control unit 24 of the radar device 10 described later. For example, a gyrosensor is applied to the posture detection sensor 7, and the posture detection sensor 7 outputs posture information which is information on a posture angle θ2 of the airframe 5 to the control unit 24. Here, the posture angle θ2 of the airframe 5 is an inclination angle when the airframe 5 is inclined from a horizontal state about the roll axis.

Next, a radar device 10 will be described with reference to FIGS. 1 and 2. As shown in FIG. 1, the radar device 10 is provided inside a radome provided in the nose of the airframe 5. The radar device 10 includes a first rotation mechanism 21, a second rotation mechanism 22, an antenna 23, and the control unit 24.

The first rotation mechanism 21 changes an orientation of the antenna 23 to change a covering area of the antenna 23. The first rotation mechanism 21 is fixed to a frame (not shown) of the airframe 5. The first rotation mechanism 21 has a first rotation axis I1 and an axial direction of the first rotation axis I1 is the same as that of the roll axis of the aircraft 1. In addition, in the first rotation mechanism 21, a fixed side of the first rotation axis I1 is a proximal side (tail side), and a distal end side (nose side) of the first rotation axis I1 is a rotation side. The first rotation mechanism 21 is electrically connected to the control unit 24 and a rotation operation of the first rotation mechanism 21 is controlled by the control unit 24. The second rotation mechanism 22 is connected to the rotation side of the first rotation mechanism 21. In addition, the first rotation mechanism 21 rotates the connected second rotation mechanism 22 such that the second rotation mechanism 22 has a predetermined rotation angle about the first rotation axis I1.

The second rotation mechanism 22 changes an orientation of a plane of polarization of the antenna 23. In the second rotation mechanism 22, a proximal side (tail side) of the second rotation mechanism 22 is connected to the first rotation mechanism 21. The second rotation mechanism 22 has a second rotation axis I2 and an axial direction of the second rotation axis I2 is an axis which is inclined relative to the first rotation axis I1. An inclination angle of the second rotation axis I2 with respect to the first rotation axis I1 is defined as an antenna inclination angle ϕ (refer to FIG. 3) and which, as illustrated in FIG. 3, is an acute angle. Moreover, in the second rotation mechanism 22, a proximal side (tail side) of the second rotation axis I2 is a connection side between the first rotation mechanism 21 and the second rotation mechanism 22, and a distal side (nose side) of the second rotation axis I2 is a rotation axis. The control unit 24 is electrically connected to the second rotation mechanism 22, and a rotation operation of the second rotation mechanism 22 is controlled by the control unit 24. The antenna 23 is connected to the rotation side of the second rotation mechanism 22. In addition, the second rotation mechanism 22 rotates the connected antenna 23 such that antenna 23 has a predetermined angle about the second rotation axis I2.

The antenna 23 is an antenna which can radiate radio waves having directivity, and for example, a phased array antenna in which a plurality of antenna elements are disposed in an array is applied to the antenna 23. The antenna 23 has an antenna surface 28 which is a predetermined plane of polarization and radiates the radio wave, and the antenna surface 28 is a flat surface. In addition, the antenna surface 28 is formed in a circular shape. A covering area of the antenna 23 is a predetermined antenna covering area E which is an area radially spreading outward from the antenna surface 28 about the second rotation axis I2 (refer to FIG. 3).

In addition, the plane of polarization of the radio waves radiated from the antenna 23 is a plane including vibrations of an electric field in the radio waves and propagation directions of the radio waves, and is a plane orthogonal to the antenna surface 28. Although the details will be described later, the plane of polarization of the radio waves radiated from the antenna surface 28 is maintained to be a preset reference plane of polarization.

The control unit 24 can individually control the first rotation mechanism 21 and the second rotation mechanism 22. By inputting a first angle command signal to the first rotation mechanism 21, the control unit 24 rotates the first rotation mechanism 21 about the first rotation axis I1 such that the first rotation mechanism 21 has a predetermined rotation angle based on the first angle command signal. In addition, by inputting a second angle command signal to the second rotation mechanism 22, the control unit 24 rotates the second rotation mechanism 22 about the second rotation axis I2 such that the second rotation mechanism 22 has a predetermined rotation angle based on the second angle command signal.

Specifically, the control unit 24 controls the first rotation mechanism 21 and the second rotation mechanism 22 such that the plane of polarization of the antenna 23 is the reference plane of polarization. Here, two reference planes of polarization are prepared, and there are a plane of polarization fixed with reference to a ground coordinate system of the ground and a plane of polarization fixed with reference to an airframe coordinate system of the airframe 5. The plane of polarization fixed with reference to the ground coordinate system of the ground is a plane of polarization of vertically polarized waves perpendicular to the ground. In addition, in the first embodiment, the plane of polarization is the plane of polarization of vertically polarized waves. However, the plane of polarization may be a plane of polarization of horizontally polarized waves according to a use of the radar device 10. Moreover, for example, the plane of polarization fixed with reference to the airframe coordinate system of the airframe 5 is a plane of polarization which is plane including the roll axis and the yaw axis of the airframe 5. In addition, in the first embodiment, the plane of polarization is the plane of polarization including the roll axis and the yaw axis of the airframe 5. However, the plane of polarization may be a plane of polarization corresponding to characteristics of the radome and is not particularly limited.

Moreover, as shown in FIG. 4, the control unit 24 includes a switching circuit 31 for switching a mode to a polarization plane airframe fixed mode fixed with reference to the airframe coordinate system and a polarization plane ground fixed mode fixed with reference to the ground coordinate system. When the polarization plane airframe fixed mode is performed, the switching circuit 31 is in an OFF state in which the posture information is not input and when the polarization plane ground fixed mode is performed, the switching circuit 31 is in an ON state in which the posture information is input. That is, the control unit 24 set the switching circuit 31 to the ON state, and thus, the polarization plane ground fixed mode is realized, and the control unit 24 set the switching circuit 31 to the OFF state, and thus, the polarization plane airframe fixed mode is realized.

Next, controls of the first rotation mechanism 21 and the second rotation mechanism 22 performed by the control unit 24 in a case of the polarization plane airframe fixed mode will be described. In the polarization plane airframe fixed mode, the control unit 24 controls the first rotation mechanism 21 and the second rotation mechanism 22 such that the plane of polarization of the antenna 23 is a predetermined reference plane of polarization fixed to the airframe coordinate system. Since the switching circuit 31 is in the OFF state, the posture information is not input to the control unit 24, and the control unit 24 rotates the first rotation mechanism 21 and the second rotation mechanism 22 based on a required antenna orientation, that is, a rotation angle θ1 in which a direction (covering area enlargement direction), in which the antenna covering area E is desired to be enlarged, is realized.

Specifically, the control unit 24 inputs the rotation angle θ1 as the first angle command signal with respect to the first rotation mechanism 21. Here, in the polarization plane airframe fixed mode, in a case where the control unit 24 rotates the first rotation mechanism 21 in a forward rotation direction to set the first rotation angle θ1, the orientation of the antenna 23 and the orientation of the plane of polarization are changed in the forward rotation direction. Accordingly, the control unit 24 rotates the second rotation mechanism 22 in a rearward rotation direction by the same angle as the rotation angle θ1. That is, the control unit 24 inputs a rotation angle −θ1 as the second angle command signal with respect to the second rotation mechanism 22. Accordingly, the rotation in the forward rotation direction of the plane of polarization by the first rotation mechanism 21 can be canceled off by the rotation in the rearward rotation direction of the plane of polarization by the second rotation mechanism 22, and thus, the control unit 24 can maintain the plane of polarization at the reference plane of polarization. Moreover, the first rotation mechanism 21 may be set in the rearward rotation direction and the second rotation mechanism 22 may be set in the forward rotation direction.

Next, controls of the first rotation mechanism 21 and the second rotation mechanism 22 performed by the control unit 24 in a case of the polarization plane ground fixed mode will be described. In the polarization plane ground fixed mode, the control unit 24 controls the first rotation mechanism 21 and the second rotation mechanism 22 such that the plane of polarization of the antenna 23 is a predetermined reference plane of polarization fixed to the ground coordinate system. Since the switching circuit 31 is in the ON state, the posture information (the information of the posture angle ϕ2) is input to the control unit 24. Accordingly, the control unit 24 rotates the first rotation mechanism 21 and the second rotation mechanism 22 based on the input posture information and the rotation angle θ1 which is the required antenna covering area E.

Specifically, the control unit 24 inputs the rotation angle θ1 as the first angle command signal with respect to the first rotation mechanism 21. Here, in the polarization plane ground fixed mode, in a case where the control unit 24 rotates the first rotation mechanism 21 in the forward rotation direction to set the rotation angle θ1, the orientation of the antenna 23 and the orientation of the plane of polarization are changed in the forward rotation direction, and the orientation of the plane of polarization is changed by the posture angle θ2 of the airframe 5. Accordingly, the control unit 24 rotates the second rotation mechanism 22 in a rearward rotation direction by the same angle as the rotation angle θ1 and rotates the second rotation mechanism 22 in the rearward rotation direction by the same angle as the posture angle θ2 of the airframe 5 detected by the posture detection sensor 7. That is, the control unit 24 inputs a value obtained by adding the rotation angle −θ1 and the posture angle −θ2 as the second angle command signal with respect to the second rotation mechanism 22. Accordingly, the rotation in the forward rotation direction of the plane of polarization by the first rotation mechanism 21 can be canceled off by the rotation in the rearward rotation direction of the plane of polarization by the second rotation mechanism 22, the rotation of the plane of polarization due to the change of the posture of the airframe 5 can be canceled off by the rotation of the second rotation mechanism 22, and thus, the control unit 24 can maintain the plane of polarization at the reference plane of polarization. Moreover, the forward rotation direction of the first rotation mechanism 21 may be any one of the clockwise direction and the counterclockwise direction, and similarly, the rearward rotation direction of the second rotation mechanism 22 may be any direction as long as the rotation direction is opposite to the forward rotation direction of the first rotation mechanism 21.

In this way, the control unit 24 individually controls the first rotation mechanism 21 and the second rotation mechanism 22, inputs the first angle command signal to the first rotation mechanism 21, and inputs the second angle command signal to the second rotation mechanism 22. Accordingly, the first rotation mechanism 21 and the second rotation mechanism 22 are simultaneously controlled.

As described above, according to the first embodiment, since the first rotation axis I1 is inclined with respect to the second rotation axis I2, the antenna 23 and the second rotation mechanism 22 are rotated about the first rotation axis I1 by the first rotation mechanism 21, and thus, the orientation of antenna 23, that is, a radiation direction of the radio wave can be changed. Accordingly, the covering area of the radar device 10 can be made a wide area. In this case, if the orientation of the antenna 23 is changed by the first rotation mechanism 21, the orientation of the plane of polarization of the antenna 23 is also changed. Therefore, by rotating the antenna 23 within the antenna surface 28 about the second rotation axis I2 by the second rotation mechanism 22, the orientation of the plane of polarization can be set to a predetermined orientation. Accordingly, the plane of polarization of the antenna 23 can be set to a predetermined orientation suitable for the operation of the radar device 10. In addition, the first rotation mechanism 21 is connected to the second rotation mechanism 22, the second rotation mechanism 22 is connected to the antenna 23, and by rotating the rotation mechanisms 21 and 22, it easily changes the orientation of the antenna 23 by a simple configuration without providing a mechanism having a large volume such as a gimbal mechanism, and a compact configuration can be realized.

In addition, according to the first embodiment, it is possible to change the orientation of the antenna 23 about the roll axis of the airframe 5, and thus, it is possible to enlarge the covering area about the roll axis of the airframe 5.

Moreover, according to the first embodiment, even when the orientation of the antenna 23 is changed, the plane of polarization of the antenna 23 can be maintained at the reference plane of polarization, and thus, it is possible to suppress degradation in detection performance.

In addition, according to the first embodiment, the orientation of the plane of polarization of the antenna 23 which is changed in the forward rotation direction by the rotation of the first rotation mechanism 21 can be canceled off by the rotation of the second rotation mechanism 22 in the rearward rotation direction, and thus, the plane of polarization of the antenna 23 can be easily maintained at the reference plane of polarization.

Moreover, according to the first embodiment, in the polarization plane airframe fixed mode, the reference plane of polarization is fixed to the airframe 5, and thus, for example, in a case where the antenna 23 is provided in the radome, the orientation of the plane of polarization can be set to a constant orientation, and it is possible to suppress the degradation in the detection performance generated by a change in characteristics of the radome.

Moreover, according to the first embodiment, in the polarization plane ground fixed mode, the reference plane of polarization is fixed to the ground. Therefore, even in a case where the posture of the airframe 5 on which the antenna 23 is mounted is changed, the orientation of the plane of polarization in a space on the ground can be set to a constant orientation, and it is possible to suppress the degradation in the detection performance generated by a change of the posture of the airframe 5.

Moreover, according to the first embodiment, the polarization plane airframe fixed mode and the polarization plane ground fixed mode can be appropriately switched by the switching circuit 31, and thus, it is possible to increase versatility of the radar device 10.

In addition, according to the first embodiment, the first rotation mechanism 21 and the second rotation mechanism 22 are individually controlled simultaneously, and thus, it is possible to rapidly control the first rotation mechanism 21 and the second rotation mechanism 22, it is possible to suppress a time lag, and it is possible to accurately perform rapid detection.

In addition, according to the first embodiment, it is possible to suitably detect a target by the compact radar device 10 having the covering area in a wide area.

Second Embodiment

Figure 5:
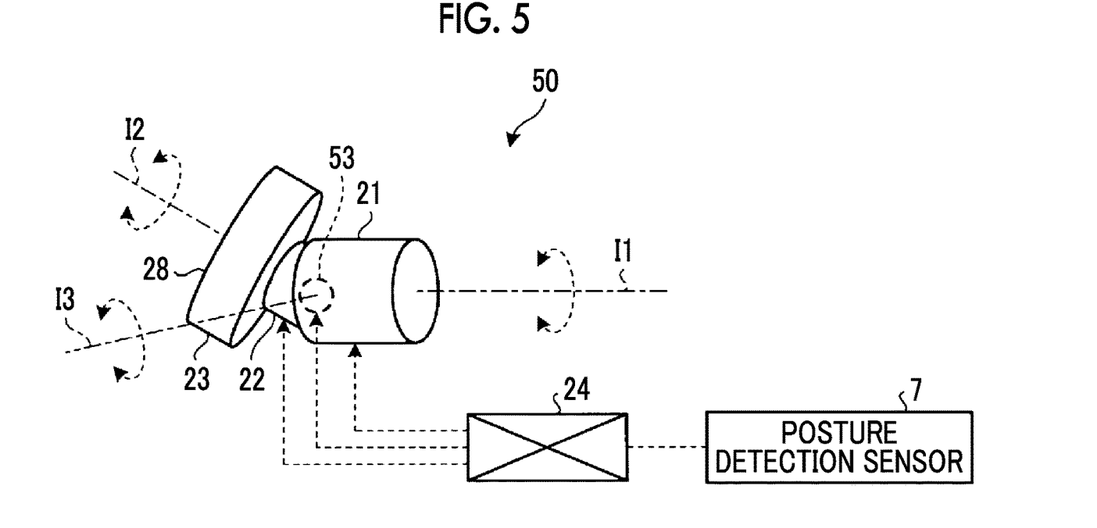
FIG. 5 is a perspective diagram schematically showing a radar device according to a second embodiment.
Figure 6:
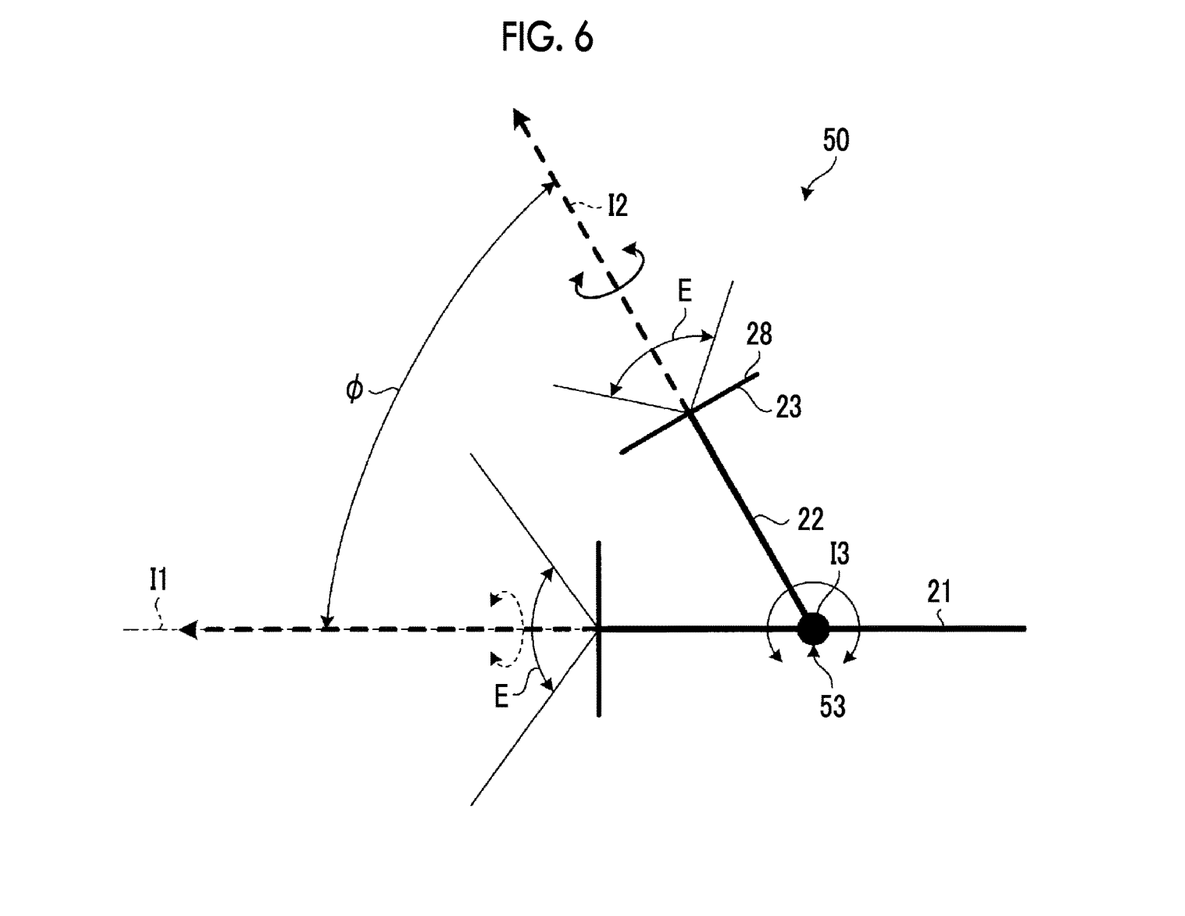
FIG. 6 is an explanatory diagram concerning a covering area of the radar device according to the second embodiment.
Figure 7:
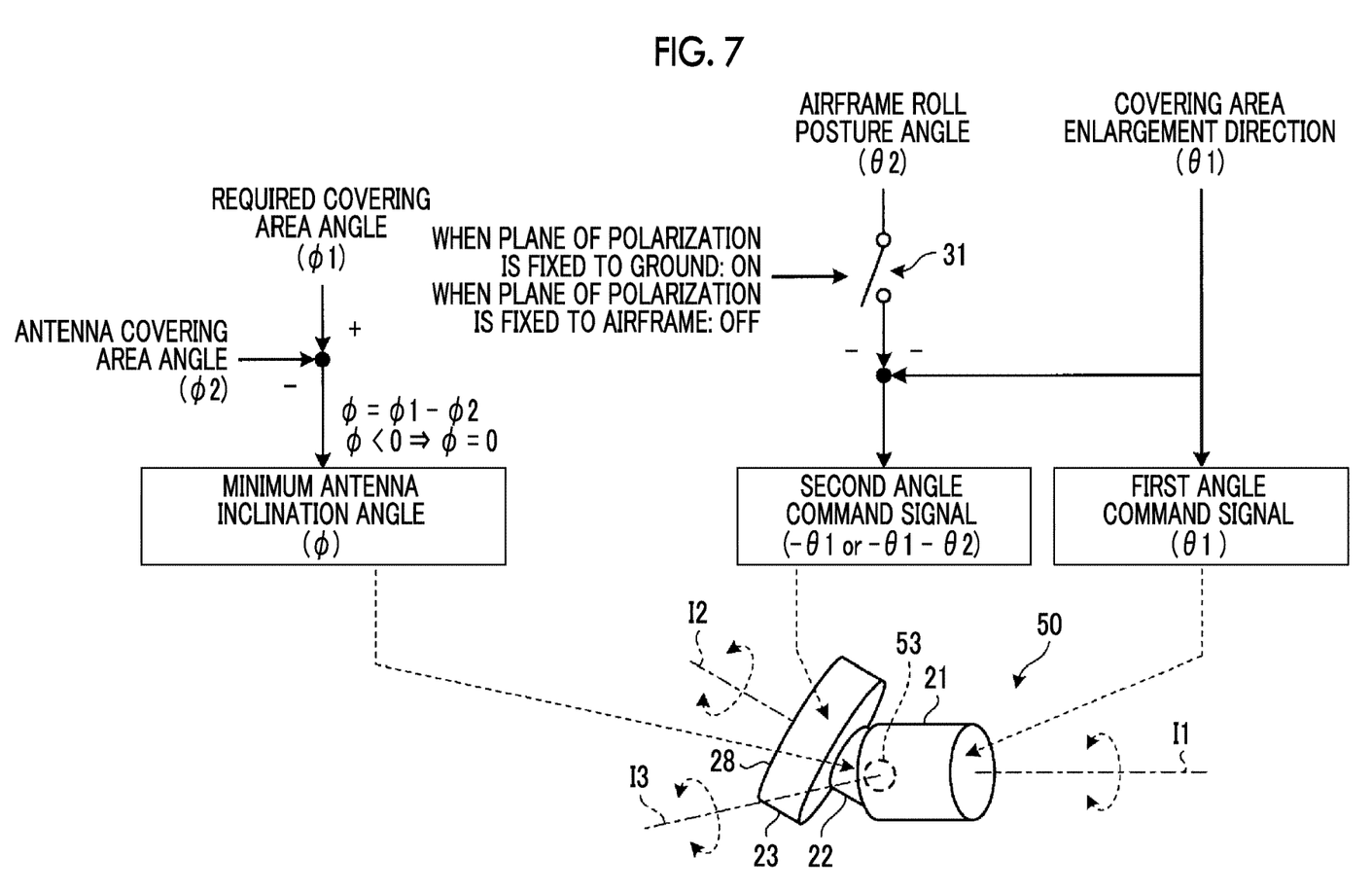
FIG. 7 is an explanatory diagram concerning a control unit of the radar device according to the second embodiment.

Next, a radar device 50 according to a second embodiment will be described with reference to FIG. 5 to 7. In addition, in the second embodiment, in order to avoid redundant descriptions, a portion different from the first embodiment will be described, and portions having the same configuration as that of the first embodiment will be described with the same reference numerals. FIG. 5 is a perspective diagram schematically showing the radar device according to the second embodiment. FIG. 6 is an explanatory diagram concerning a covering area of the radar device according to the second embodiment. FIG. 7 is an explanatory diagram concerning a control unit of the radar device according to the second embodiment.

The radar device 50 of the second embodiment further includes a third rotation mechanism 53 in addition to the radar device 10 of the first embodiment.

The third rotation mechanism 53 changes the orientation of the antenna 23 so as to change the covering area of the antenna 23. The third rotation mechanism 53 is provided between the first rotation mechanism 21 and the second rotation mechanism 22. The third rotation mechanism 53 includes a third rotation axis I3 provided on the second rotation axis I2 and an axial direction of the third rotation axis I3 is a direction orthogonal to the second rotation axis I2. In addition, a tail side of the third rotation mechanism 53 is connected to the first rotation mechanism 21 and a nose side of the third rotation mechanism 53 is connected to the second rotation mechanism 22. The control unit 24 is electrically connected to the third rotation mechanism 53, and a rotation operation of the third rotation mechanism is controlled by the control unit 24. The third rotation mechanism 53 inclines the second rotation axis I2 of the second rotation mechanism 22 with respect to the first rotation axis I1 of the first rotation mechanism 21 so as to have the predetermined antenna inclination angle $\phi$ about the third rotation axis I3.

The control unit 24 can individually control the third rotation mechanism 53 in addition to the first rotation mechanism 21 and the second rotation mechanism 22. The control unit 24 inputs a signal having the predetermined antenna inclination angle $\phi$ to the third rotation mechanism 53, and thus, the third rotation mechanism 53 rotates about the third rotation axis I3 so as to be the predetermined antenna inclination angle $\phi$ based on the signal.

Specifically, the control unit 24 controls the third rotation mechanism 53 to have the antenna inclination angle (minimum antenna inclination angle) which is the minimum based on an antenna inclination angle (required covering area angle $\phi 1$ necessary to obtain a requested covering area and an angle (antenna covering area angle) $\phi 2$ of the antenna covering area E. That is, the minimum antenna inclination angle $\phi$ is obtained by subtracting the antenna covering area angle $\phi 2$ from the required covering area angle $\phi 1$, and thus, "$\phi = \phi 1 - \phi 2$" is satisfied. Here, the antenna covering area angle $\phi 2$ is the maximum beam swing angle of the radio wave which can be radiated by the antenna 23. In addition, the minimum antenna inclination angle $\phi$ is the minimum antenna inclination angle $\phi$ which is allowed in a case where the target does not exist in front (in the roll axis direction).

If the control unit 24 acquires the required covering area angle $\phi 1$ and the antenna covering area angle $\phi 2$, the control unit 24 calculates the minimum antenna inclination angle $\phi$ based on the required covering area angle $\phi 1$ and the antenna covering area angle $\phi 2$. In a case where the control unit 24 calculates the minimum antenna inclination angle $\phi$ and the minimum antenna inclination angle $\phi$ is smaller than zero ($\phi < 0$), the control unit 24 does not perform the rotation by the third rotation mechanism 53 on the assumption that the minimum antenna inclination angle $\phi$ is zero. Meanwhile, in a case where the control unit 24 calculates the minimum antenna inclination angle $\phi$ and the minimum antenna inclination angle $\phi$ is more than zero, the control unit 24 does perform the rotation by the third rotation mechanism 53 such that that the minimum antenna inclination angle $\phi$ is realized.

As described above, according to the second embodiment, the inclination angle of the second rotation axis I2 with respect to the first rotation axis I1 can be an appropriate angle by the third rotation mechanism 53. Accordingly, for example, the second rotation axis I2 can be inclined with respect to the first rotation axis I1 such that the area of the antenna surface 28 is the maximum in a direction in which the antenna surface 28 stands toward the detected target, that is, in a direction in which the target and the antenna surface 28 face each other. Therefore, it is possible to suppress a loss of the radio waves radiated from the antenna surface 28, and thus, it is possible to increase a detection length, and it is possible to detect a further distant target. In addition, for example, the covering area can be increased by lowering the antenna surface 28, that is, by increasing the inclination angle of the second rotation axis I2 with respect to the first rotation axis I1. From the above, the second rotation axis I2 with respect to the first rotation axis I1 is inclined by the third rotation mechanism 53, and thus, it is possible to increase versatility.

REFERENCE SIGNS LIST

1: aircraft
5: airframe
7: posture detection sensor
10: radar device
21: first rotation mechanism
22: second rotation mechanism
23: antenna 24: control unit
28: antenna surface
31: switching circuit
50: radar device (second embodiment)
53: third rotation mechanism
I1: first rotation axis
I2: second rotation axis
I3: third rotation axis
φ: antenna inclination angle
φ1: required covering area angle
φ2: antenna covering area angle
E: antenna covering area

The invention claimed is:

1. A radar device comprising:
    an antenna having an antenna surface configured to radiate radio waves so as to be a predetermined plane of polarization;
    a second rotation mechanism connected to the antenna and configured to rotate the antenna about a second rotation axis, the second rotation axis extending in a normal direction orthogonal to the antenna surface; and
    a first rotation mechanism connected fixed to the second rotation mechanism at an acute angle relative to the second rotation mechanism, the first rotation mechanism being configured to rotate the antenna and the second rotation mechanism about a first rotation axis, the first rotation axis being inclined with respect to the second rotation axis,
    wherein the antenna is a phased array antenna.

2. The radar device according to claim 1, wherein the first rotation axis is a roll axis of an airframe on which the antenna is mounted.

3. The radar device according to claim 1, further comprising:
    a control unit configured to control the first rotation mechanism and the second rotation mechanism,
    wherein a reference plane of polarization is set in advance, and
    wherein the control unit is configured to control the first rotation mechanism and the second rotation mechanism such that the predetermined plane of polarization of the antenna is the reference plane of polarization.

4. The radar device according to claim 3, wherein, in a case where the control unit controls a rotation direction of the first rotation mechanism in a forward rotation direction, the control unit is configured to control a rotation direction of the second rotation mechanism in a rearward rotation direction.

5. The radar device according to claim 3, wherein the reference plane of polarization is a plane of polarization fixed with reference to an airframe coordinate system of an airframe on which the antenna is mounted.

6. The radar device according to claim 3, wherein the reference plane of polarization is a plane of polarization fixed with reference to a ground coordinate system.

7. The radar device according to claim 6, wherein the control unit is configured to acquire posture information which is information on a posture angle of an airframe on which the antenna is mounted, and to control the first rotation mechanism and the second rotation mechanism based on the posture information such that the predetermined plane of polarization of the antenna is the reference plane of polarization fixed with reference to the ground coordinate system.

8. The radar device according to claim 3,
    wherein a polarization plane airframe fixed mode in which the predetermined reference plane of polarization is fixed with reference to an airframe coordinate system of an airframe on which the antenna is mounted and a polarization plane ground fixed mode in which the reference plane of polarization is fixed with reference to the ground coordinate system are prepared in advance, and
    wherein the control unit includes a switching circuit configured to switch between the polarization plane airframe fixed mode and the polarization plane ground fixed mode.

9. The radar device according to claim 3, wherein the control unit is configured to individually control the first rotation mechanism and the second rotation mechanism, input a first angle command signal to the first rotation mechanism, and input a second angle command signal to the second rotation mechanism to simultaneously control the first rotation mechanism and the second rotation mechanism.

10. The radar device according to claim 1, further comprising:
    a third rotation mechanism configured to incline the second rotation axis with respect to the first rotation axis about a third rotation axis provided on the second rotation axis with a direction orthogonal to the second rotation axis as an axial direction of the third rotation axis.

11. An aircraft comprising:
    the radar device according to claim 1; and
    an airframe having a nose, the radar device being mounted on the nose of the airframe.

\* \* \* \* \*